United States Patent [19]
Stewart

[11] Patent Number: 5,921,740
[45] Date of Patent: Jul. 13, 1999

[54] DEVICE FOR AUTOMATICALLY LOADING A CONTAINER

[76] Inventor: Thomas D. Stewart, Rte. 12, Box 492D, Crossville, Tenn. 38555

[21] Appl. No.: 08/843,412

[22] Filed: Apr. 15, 1997

[51] Int. Cl.[6] ................................................. B65G 67/02
[52] U.S. Cl. ...................... 414/399; 414/398; 414/400; 414/791.6; 414/793.4; 414/809; 414/922
[58] Field of Search .................... 414/398, 399, 414/400, 572, 791.5, 791.6, 793.4, 794.5, 111, 789.7, 809, 922

[56] References Cited

U.S. PATENT DOCUMENTS

| | | | |
|---|---|---|---|
| Re. 35,555 | 7/1997 | Sjogren et al. ......................... | 414/398 |
| 2,875,907 | 3/1959 | Locke et al. ......................... | 414/791.6 |
| 3,464,572 | 9/1969 | McWilliams ............................... | 214/6 |
| 3,471,037 | 10/1969 | McWilliams ............................... | 214/6 |
| 3,474,916 | 10/1969 | McWilliams ............................... | 214/6 |
| 3,476,271 | 11/1969 | McWilliams ............................... | 214/6 |
| 3,499,551 | 3/1970 | McWilliams ............................... | 214/6 |
| 3,513,991 | 5/1970 | McWilliams ............................... | 414/398 |
| 3,625,376 | 12/1971 | McWilliams ............................... | 214/6 |
| 3,651,963 | 3/1972 | McWilliams ............................ | 214/6 G |
| 3,779,404 | 12/1973 | McWilliams ............................... | 214/41 |
| 3,836,021 | 9/1974 | McWilliams ............................... | 214/41 |
| 4,014,441 | 3/1977 | Osborn et al. ......................... | 414/922 |
| 4,104,846 | 8/1978 | Waller ................................... | 414/791.6 |
| 4,155,467 | 5/1979 | Lingl ..................................... | 414/922 |
| 4,279,557 | 7/1981 | Stodt et al. ............................. | 414/400 |
| 4,439,093 | 3/1984 | Victorino ............................... | 414/922 |
| 4,877,365 | 10/1989 | Lanigan, Jr. et al. .................. | 414/459 |
| 5,009,560 | 4/1991 | Ruder et al. ............................ | 414/399 |
| 5,181,802 | 1/1993 | Sjogren et al. ......................... | 414/331 |
| 5,201,626 | 4/1993 | Hansen .................................... | 414/398 |
| 5,346,352 | 9/1994 | Ito .......................................... | 414/398 |
| 5,391,046 | 2/1995 | Colamussi ............................... | 414/399 |
| 5,435,690 | 7/1995 | Binning ............................... | 414/791.6 |
| 5,437,537 | 8/1995 | Sweet et al. ........................... | 414/400 |
| 5,533,861 | 7/1996 | Klupfel ............................... | 414/791.6 |
| 5,540,534 | 7/1996 | Wolf et al. ............................. | 414/400 |
| 5,562,403 | 10/1996 | Winski ................................. | 414/791.6 |
| 5,733,098 | 3/1998 | Lyon et al. .......................... | 414/791.6 |
| 5,733,100 | 3/1998 | Slat et al. ............................ | 414/791.6 |

*Primary Examiner*—David A. Bucci
*Assistant Examiner*—Douglas Hess

[57] ABSTRACT

A device and process are provided for automatically loading trailers or shipping containers. Packages arriving at the loader on a conveyor belt are deposited on a loader deck, where they are moved laterally by an overhead pusher to form a row of packages. Upon formation of a row of packages, small pushers move the row onto the delivery platform. This process is repeated until the delivery platform is filled completely with packages. Once it is filled completely, the delivery platform delivers each loaded row, in turn, to the desired height and position in the container. The platform then cycles back to be reloaded with more packages, and the process is repeated. Once a vertical stack of rows the entire height of the container is formed, the loader backs out of the container by one package length and the entire process is repeated until the truck or container is filled.

24 Claims, 22 Drawing Sheets

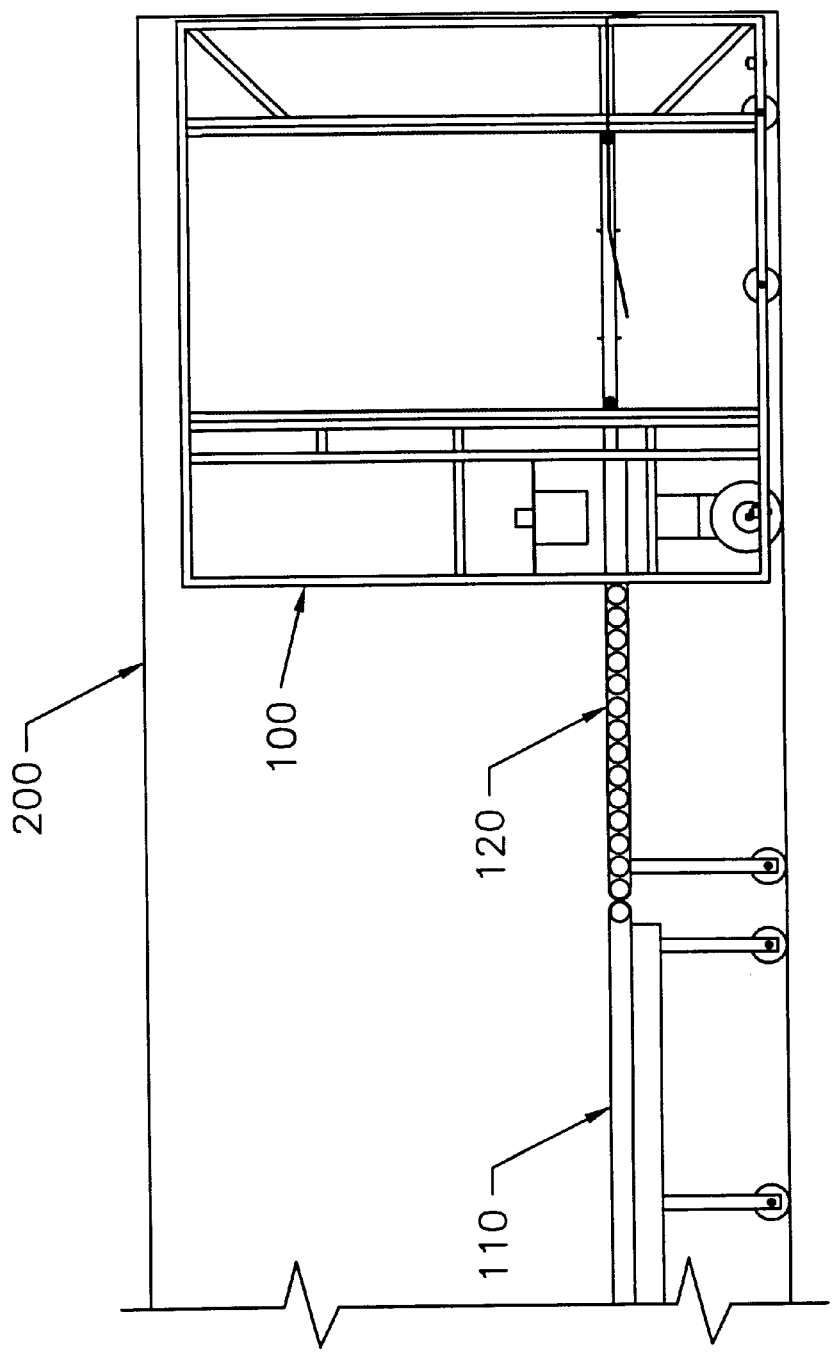

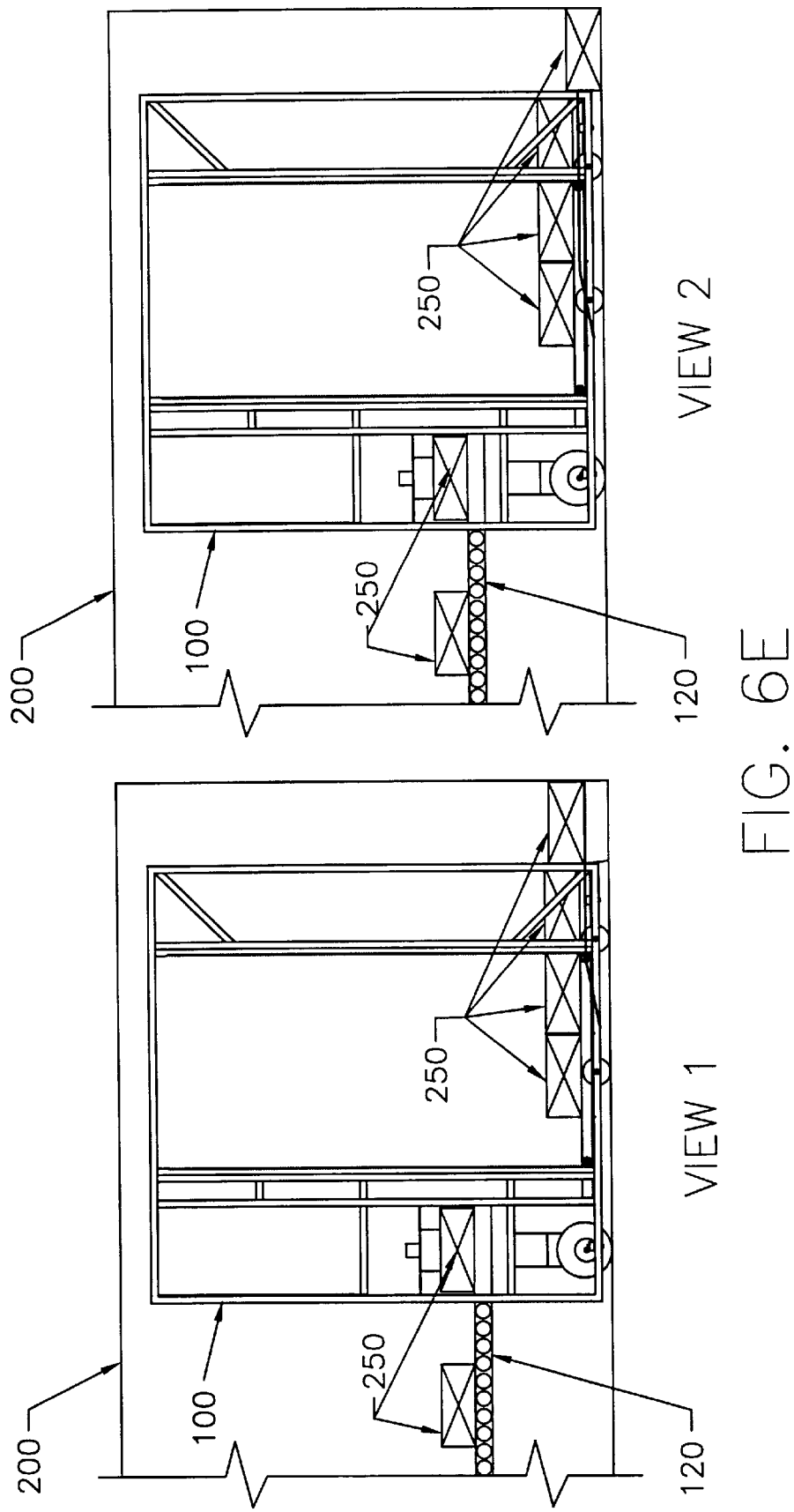

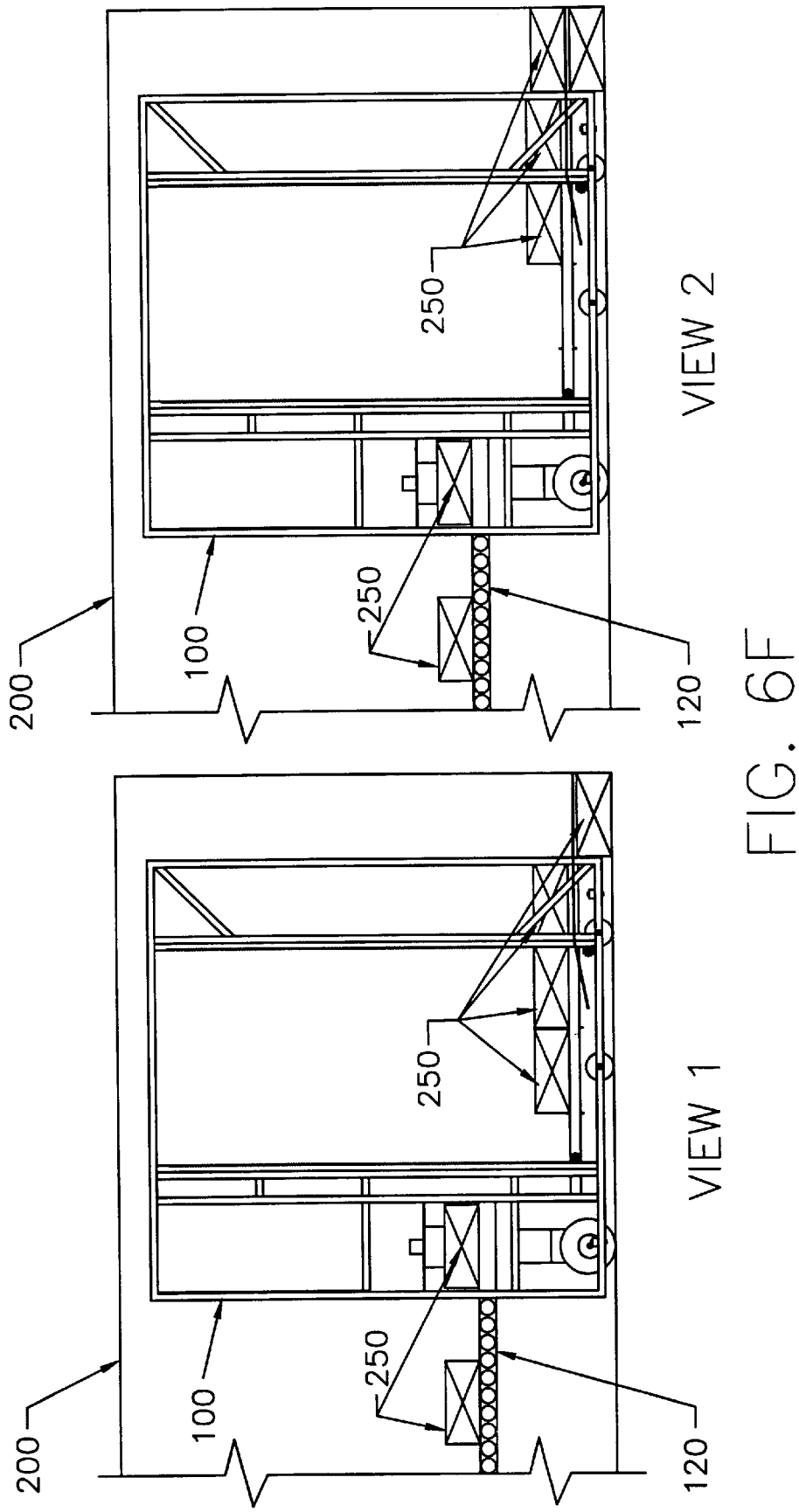

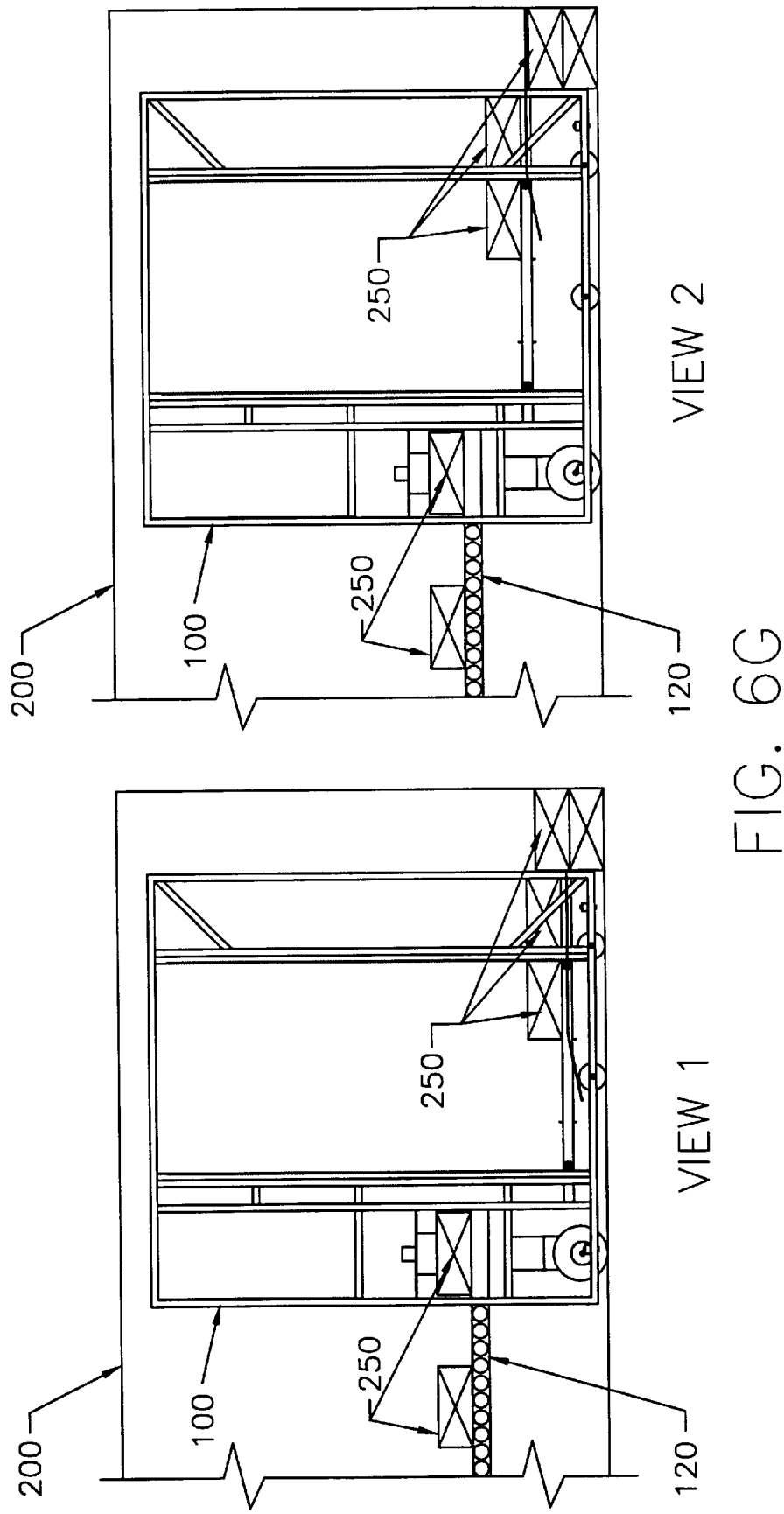

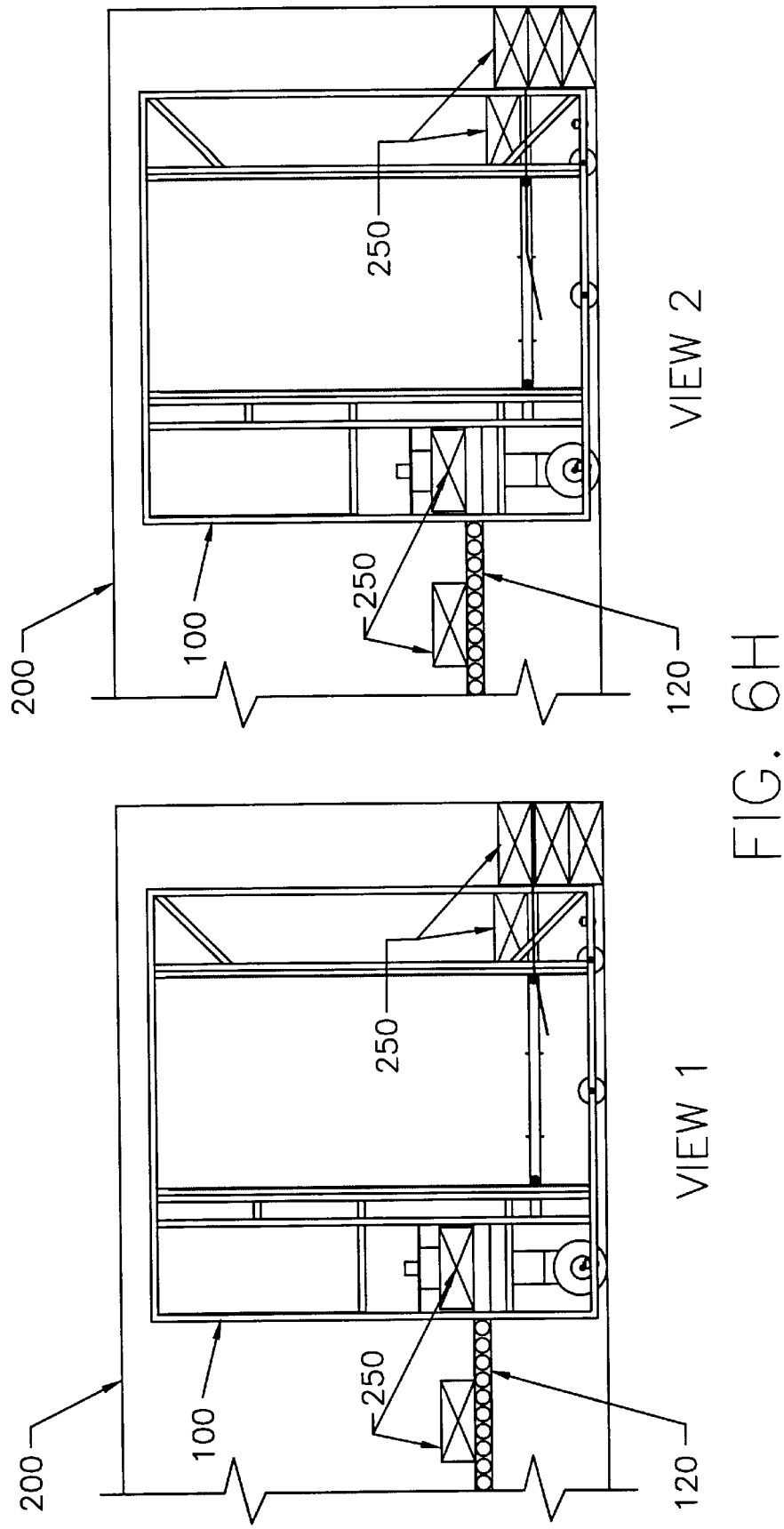

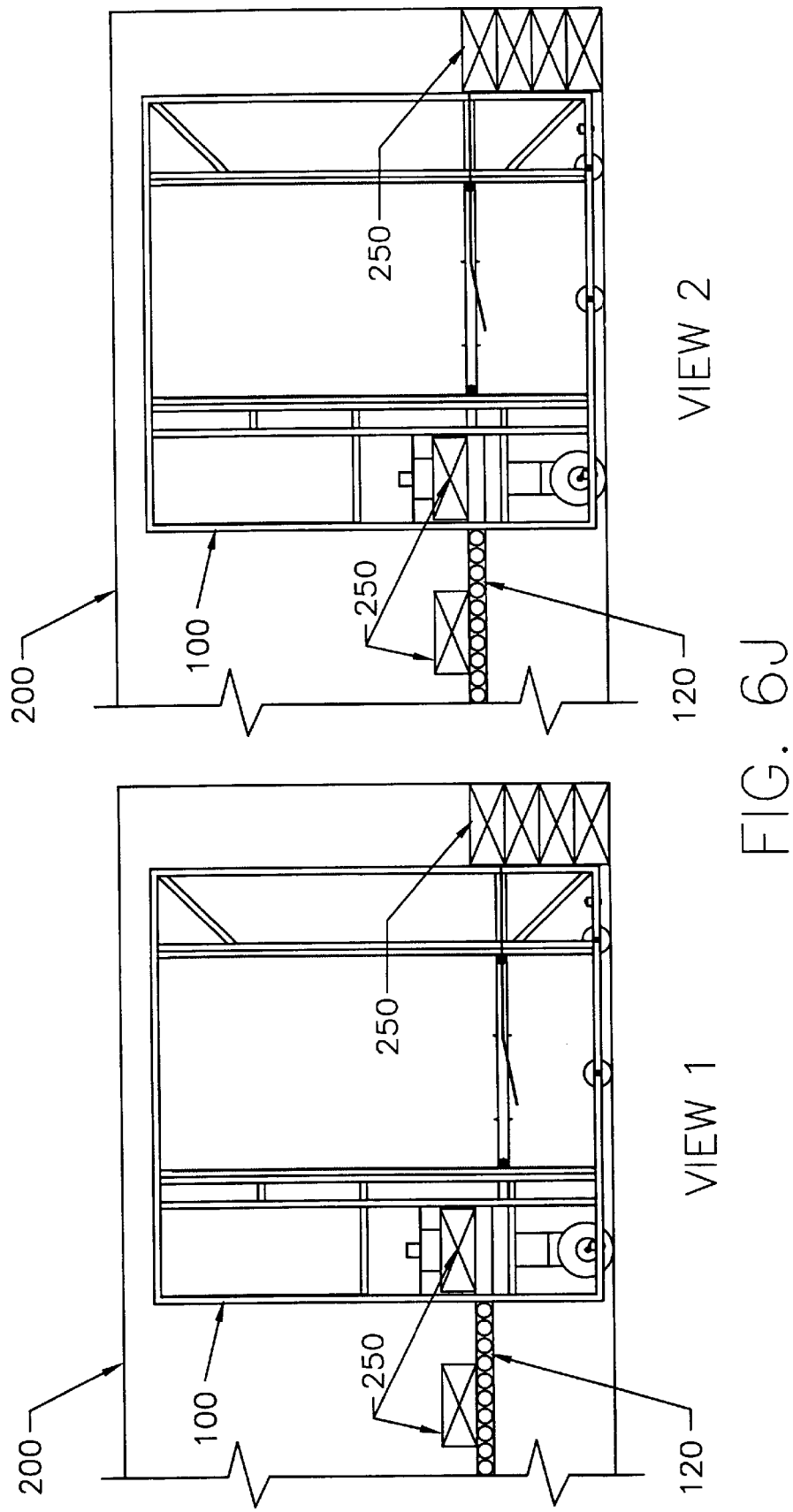

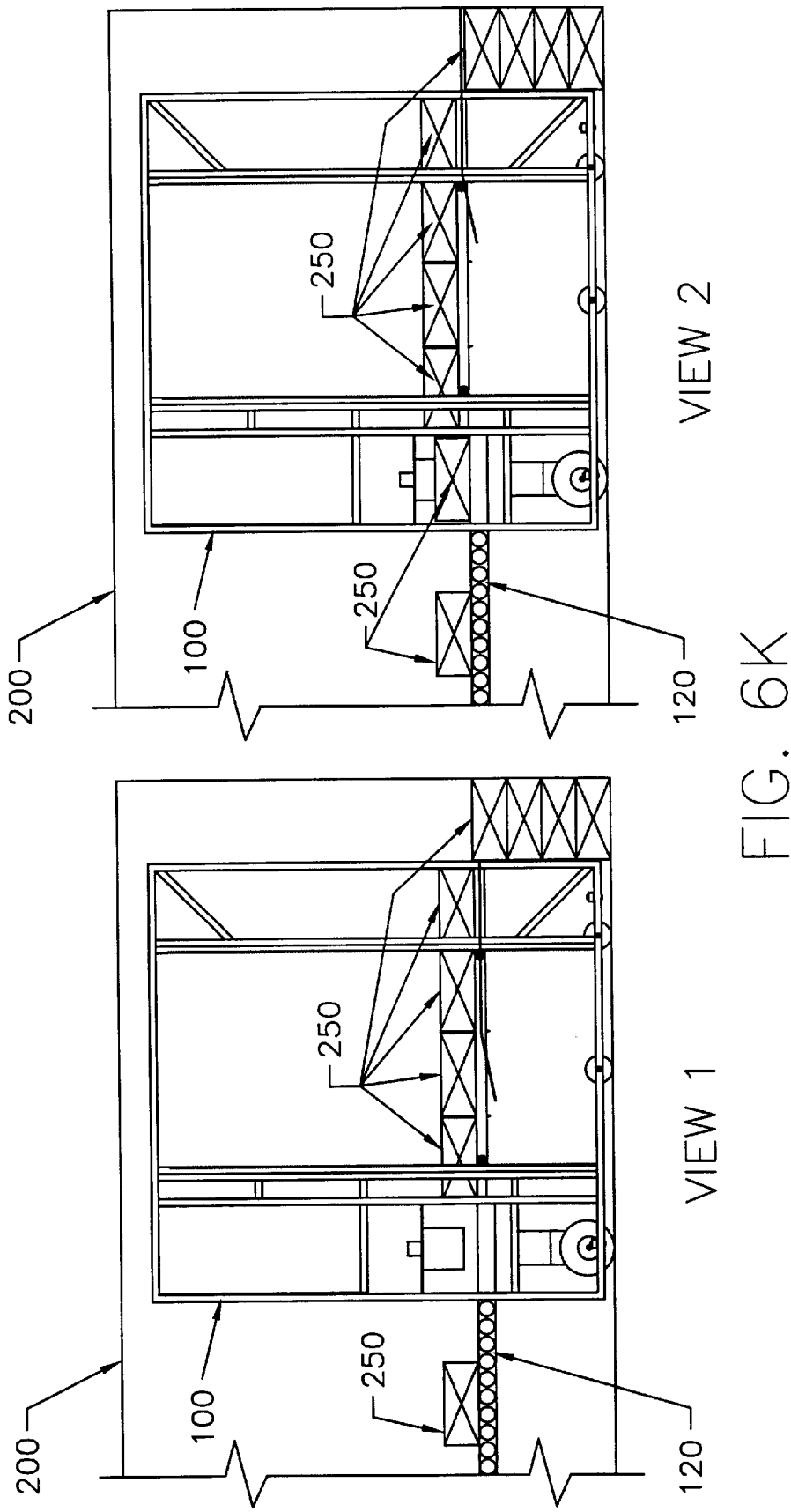

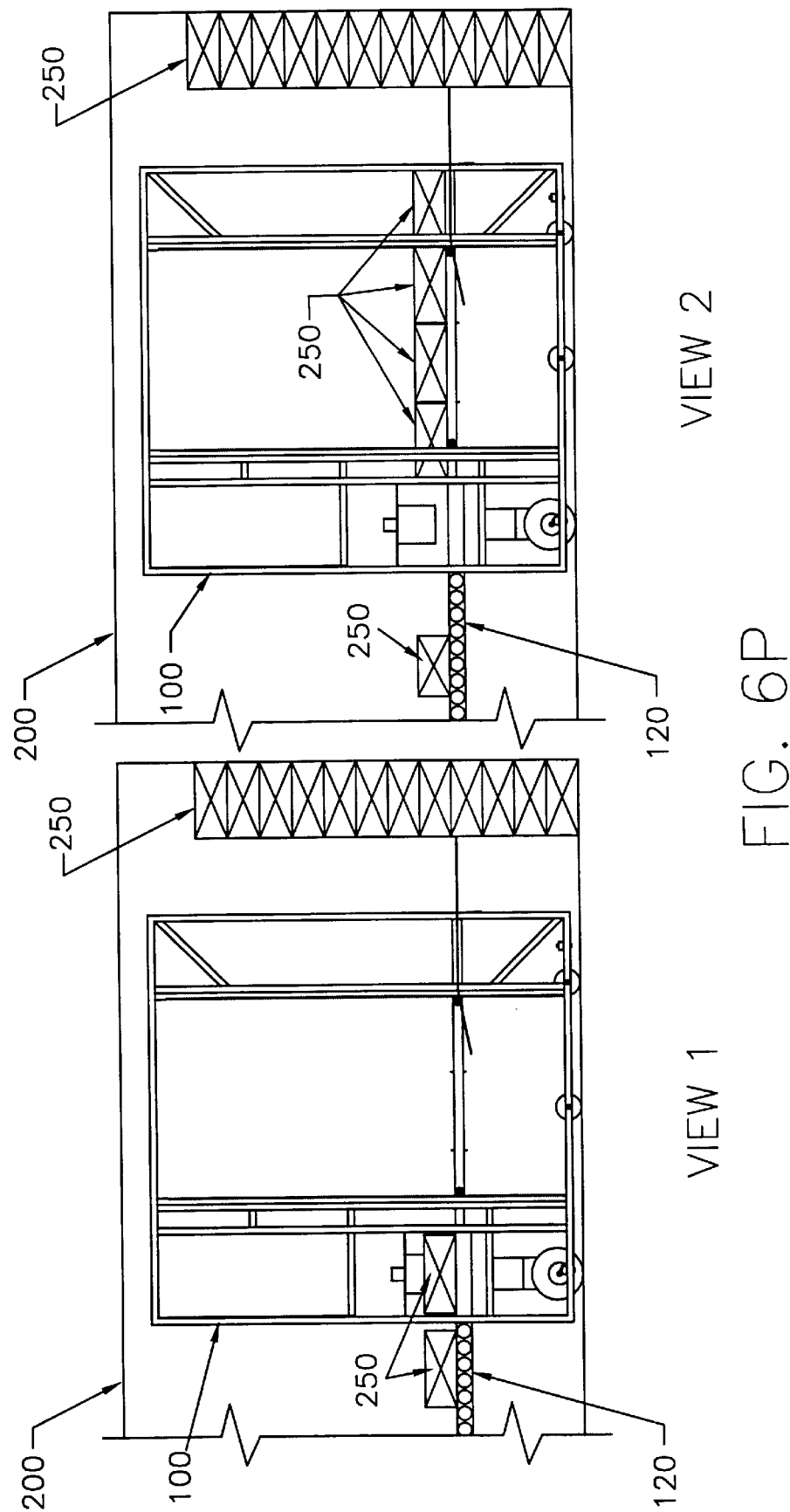

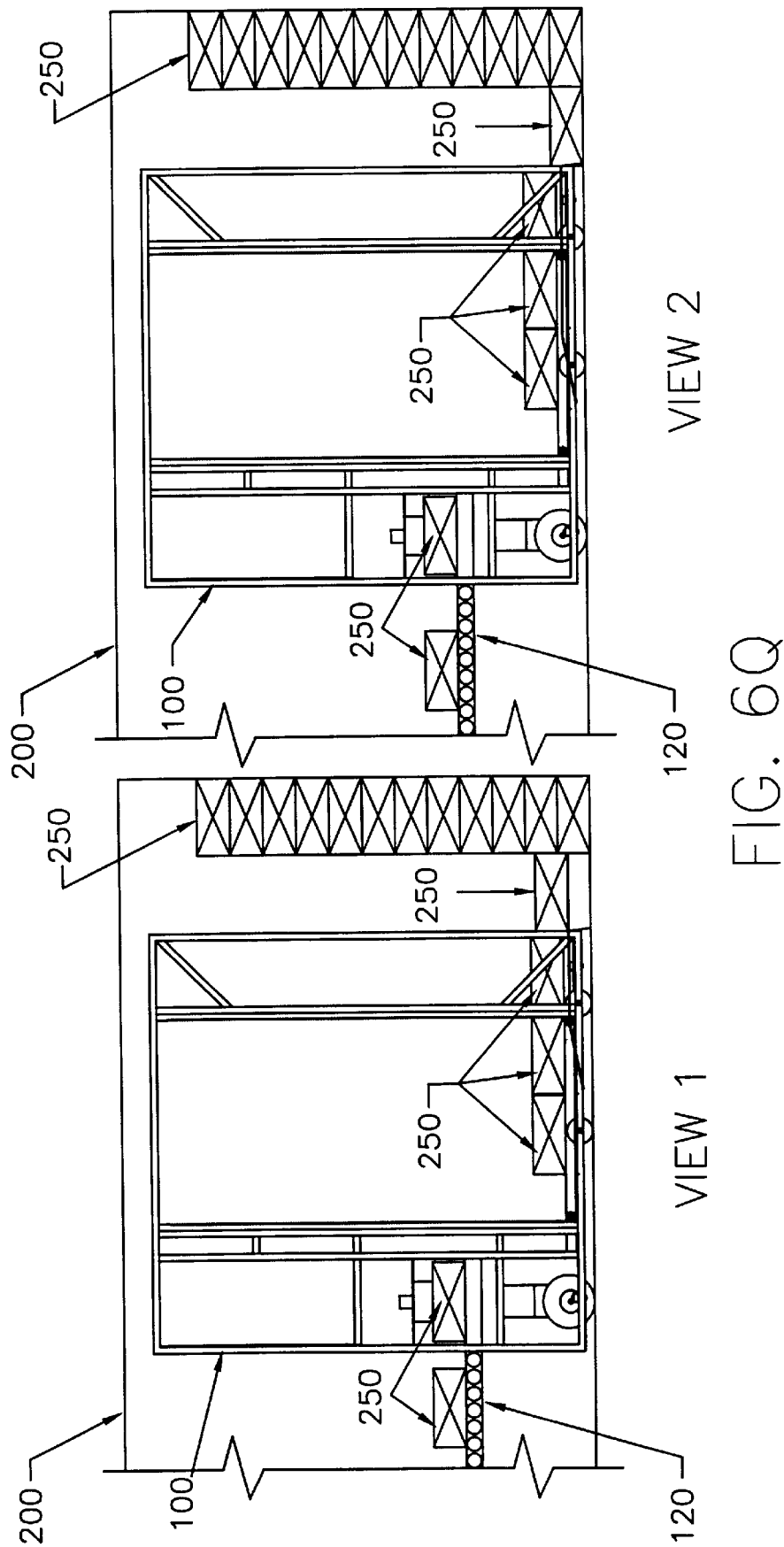

DEVICE FOR AUTOMATICALLY LOADING A CONTAINER

BACKGROUND OF THE INVENTION

1. Technical Field

This invention relates generally to a device for automatically loading a container. Particularly, this invention relates to a device for loading a shipping container or the trailer portion of a tractor trailer truck.

2. Description of the Prior Art

Trailers and shipping containers represent two of the most common cargo systems used to ship goods throughout the United States and world-wide. Labor costs alone for loading these containers run into billions of dollars per year. Additionally, injuries sustained by workers loading these containers are common, and workers compensation claims and injury related costs resulting from container loading are some of the highest of any industry.

Trailers and shipping containers are commonly loaded manually. Typically, this requires that the workers enter the container and manually position each package, involving large amounts of heavy lifting and other high injury work. Additionally, this process is slow and tedious since each package must be separately loaded and stacked.

Another common method for loading trailers and shipping containers is to stack the goods on pallets and to then load these pallets into the container using a forklift or similar piece of heavy equipment. However, it is still necessary to manually stack goods on the pallets, which is an inefficient and time consuming process. Additionally, since the pallets themselves occupy valuable shipping space, the volume of goods which can be shipped per container is decreased. Furthermore, manipulation of the heavy pallets, even using a forklift, poses a risk of injury to workers.

Several methods have been developed to load individual packages into trailers or shipping containers without the need for workers to lift heavy packages or enter the trailer or shipping container. Several of the most commonly used of these include systems developed to load mailbags into trailers. Variants of these systems, using carriages and conveyor belts, are described in a series of patents to McWilliams (U.S. Pat. Nos. 3,464,572, 3,471,037, 3,474,916, 3,476,271, 3,499,551, 3,625,376, 3,651,963, 3,779,404 and 3,836,021). However, none of these devices results in precise placement of the packages and none of them are easily generalizable to the efficient loading of uniform packages into a container.

U.S. Pat. No. 5,435,690 to Binning discloses a method and apparatus for loading layers of newspaper bundles into a cart using an elevated conveyor. The invention of Binning uses retractable guides to place layers of bundles onto the cart bottom or onto previously deposited layers. The bundles are placed in the interior of the cart by removing or opening one of the cart walls.

U.S. Pat. No. 5,181,820 to Sjogren et al. discloses another method for loading newspaper bundles into vertical carts which may then be loaded into a truck cargo space. The invention of Sjogren uses a conveyor belt and a pusher to move rows of bundles onto a loading platform. Once a complete layer of bundles is formed, the layer is then moved into the cart using a fork-like elevator platform which extends through vertical slots in one side of the cart. The layers are placed one atop another until the cart is filled.

However, the inventions of Binning and Sjogren have several disadvantages that prevent them from being easily adaptable to more general loading of packages into shipping containers and trailers. Foremost among these shortcomings is that existing shipping containers and trailers are not loaded from overhead, but are instead commonly designed to be loaded lengthwise through doors situated at one end of the container. Furthermore, it is often desirable to load the container directly, without the use of carts which can themselves take up valuable cargo space.

In U.S. Pat. No. 5,201,626, Hansen discloses a method and apparatus for loading filled sacks into a cargo container. The device of Hansen includes a loading apparatus, designed to be driven into the container, to which packages are fed via a variable length conveyor belt. The packages are pushed laterally to form a row which is moved onto a delivery platform. The delivery platform then transfers the rows to an appropriate horizontal and vertical location within the container, where the rows are unloaded and placed one atop another to form a complete vertical stack. With completion of each stack, the loader described by Hansen backs out one sack length.

However, the invention of Hansen has several major disadvantages. For example, Hansen's device requires that the delivery platform complete one full movement cycle for each row of packages to be stacked, unnecessarily slowing the loading process. Furthermore, the invention of Hansen pushes the sacks from the delivery platform, allowing them to drop and decreasing the accuracy with which the packages are delivered.

SUMMARY OF THE INVENTION

The present invention recognizes and addresses the above-discussed shortcomings and disadvantages, as well as others, of prior devices used to automatically load trailers or shipping containers. In accordance with the teachings of the present invention, a novel device for loading containers is provided.

Generally, the invention consists of an improved device and process for automatically loading trucks and shipping containers. Since this device and process are completely automated they are faster and less labor intensive than prior loading devices and processes.

More specifically, the invention relates to a device using a combination of conveyor belts and pushers to effectuate loading of a trailer or shipping container in an orderly fashion. Further, the device may enter into the trailer or shipping container to deliver rows of packages, one atop another until the trailer or shipping container is filled.

In a preferred embodiment, the loader includes several sub-assemblies including an accordion conveyor belt, a loader deck, a delivery platform, a retractable delivery guide and a controller. The controller controls the operation of conveyor belts and other moving components to coordinate the loading and movement of packages, using electric eyes or other sensing devices to determine the positions of the packages.

Packages arrive at the loader on an accordion conveyor belt where they are deposited on the loader deck. The loader deck is located at a fixed height, and is aligned with a variable height delivery platform during loading from the conveyor. Once deposited on the loader deck, the packages are moved laterally along the deck to form a complete row of packages. When the row is complete, the packages are moved one package length onto the delivery platform by frictional motivators. This process is repeated until the delivery platform is filled completely with packages.

Once it is filled completely, the delivery platform moves up or down like an elevator to deliver the packages to the desired height and position in the trailer or shipping container. The delivery platform conveyor belts force one row of packages onto the delivery guide. The delivery guide of the main loader deck is then retracted, leaving the packages on the container floor or a lower row of packages. The delivery platform then indexes up one level for delivery of the next row of packages onto the most recently deposited row of packages. This process continues until the delivery platform is empty or the desired stack height is reached. At this point the delivery platform moves back into alignment with the loader deck to receive more packages.

Importantly, the packages are stacked one row on top of another until a vertical stack of rows the entire height of the container is formed. The entire loader then backs out of the container by one package length and the accordion conveyor belt retracts by one package length. This process is repeated until the truck or container is filled.

The aforementioned and other aspects of the present invention are described in the detailed description and attached illustrations which follow.

DETAILED DESCRIPTION OF PREFERRED EMBODIMENT

Figure 1:
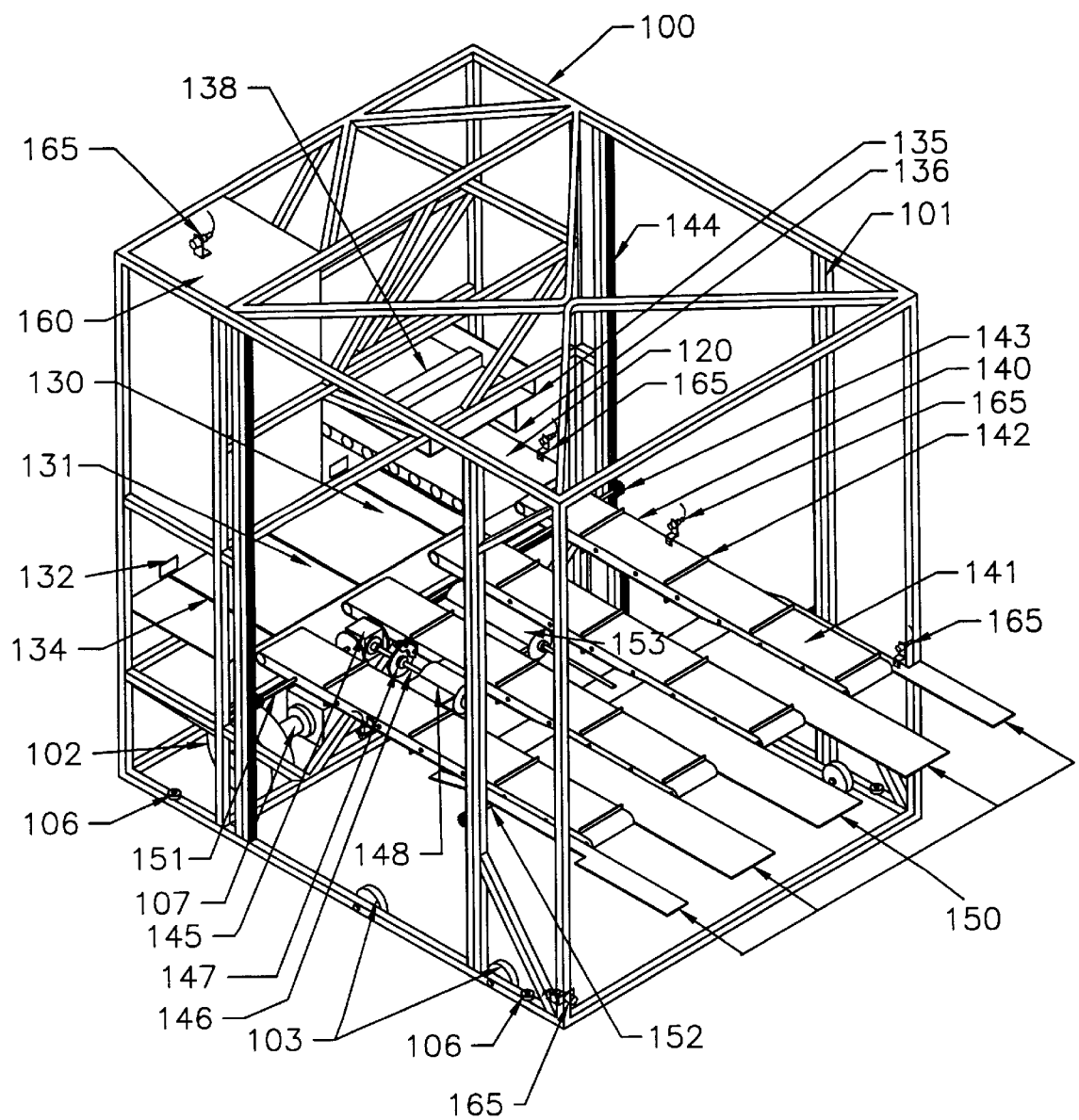
FIG. 1 is a perspective view of the device for automatically loading a container.
Figure 2:
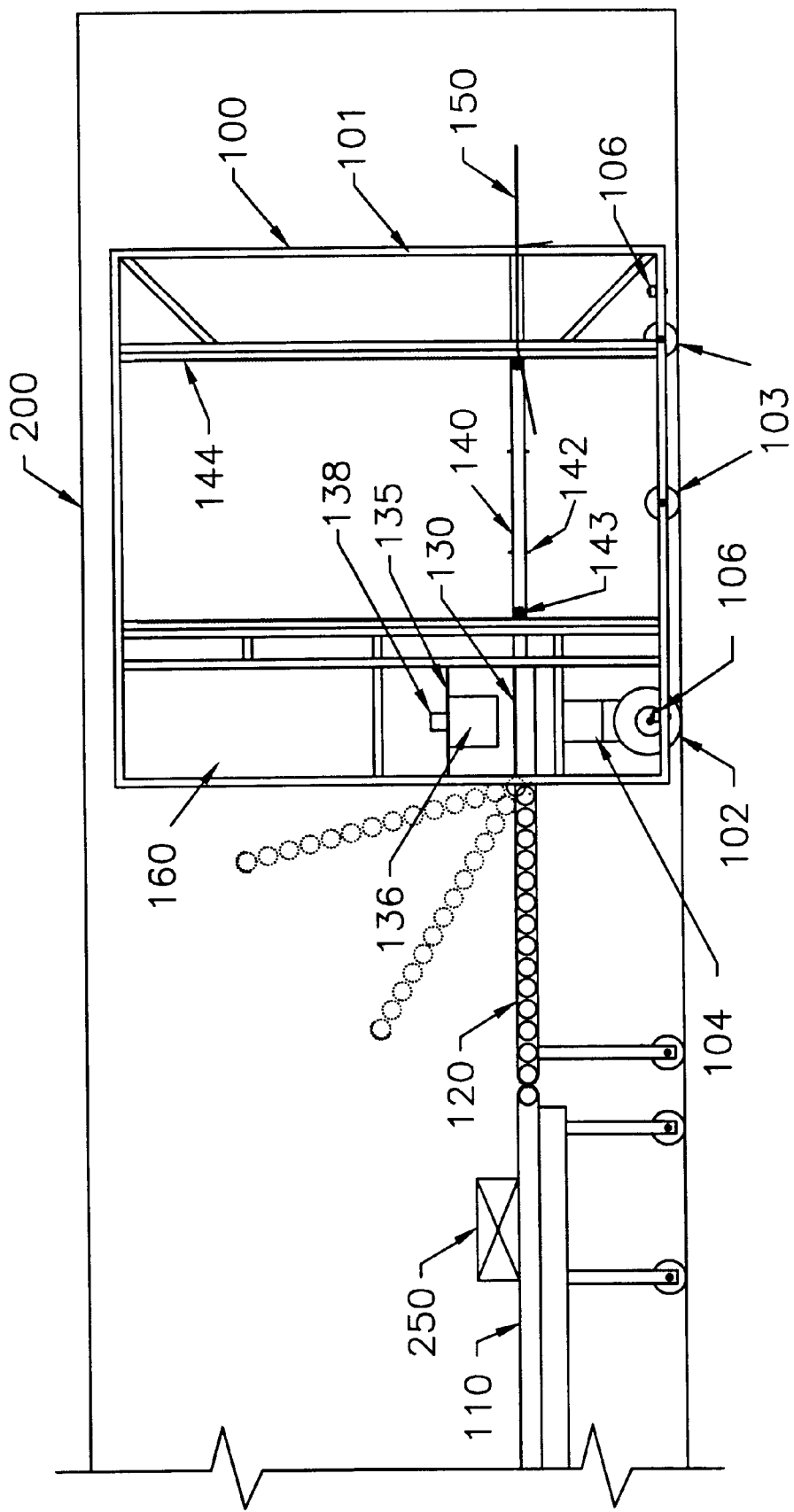
FIG. 2 is a left side view of the device for automatically loading a container.
Figure 3:
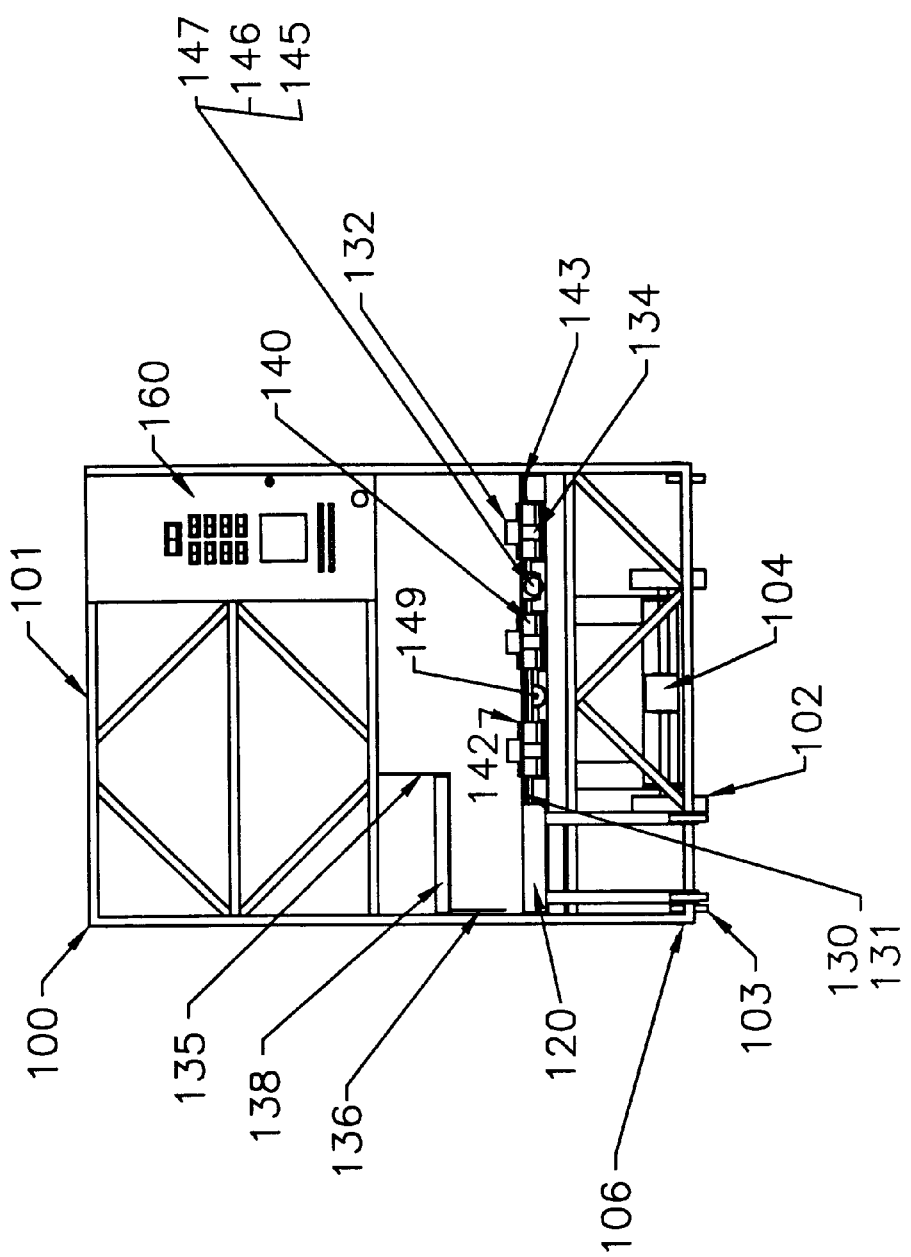
FIG. 3 is a back side view of the device for automatically loading a container.
Figure 4:
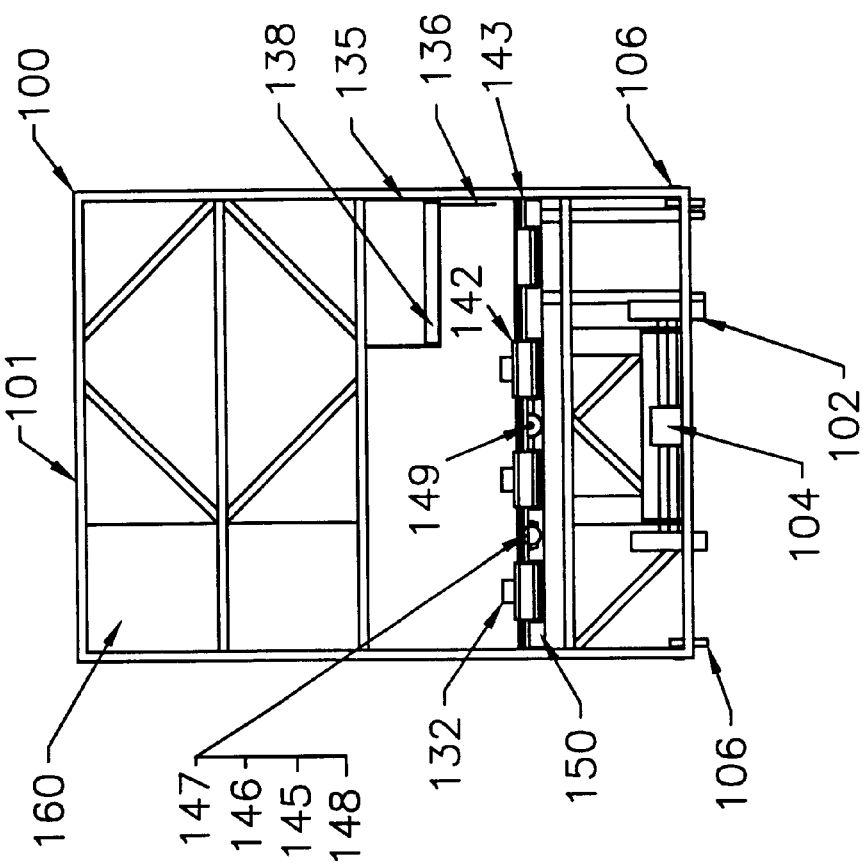
FIG. 4 is a front side view of the device for automatically loading a container.
Figure 5:
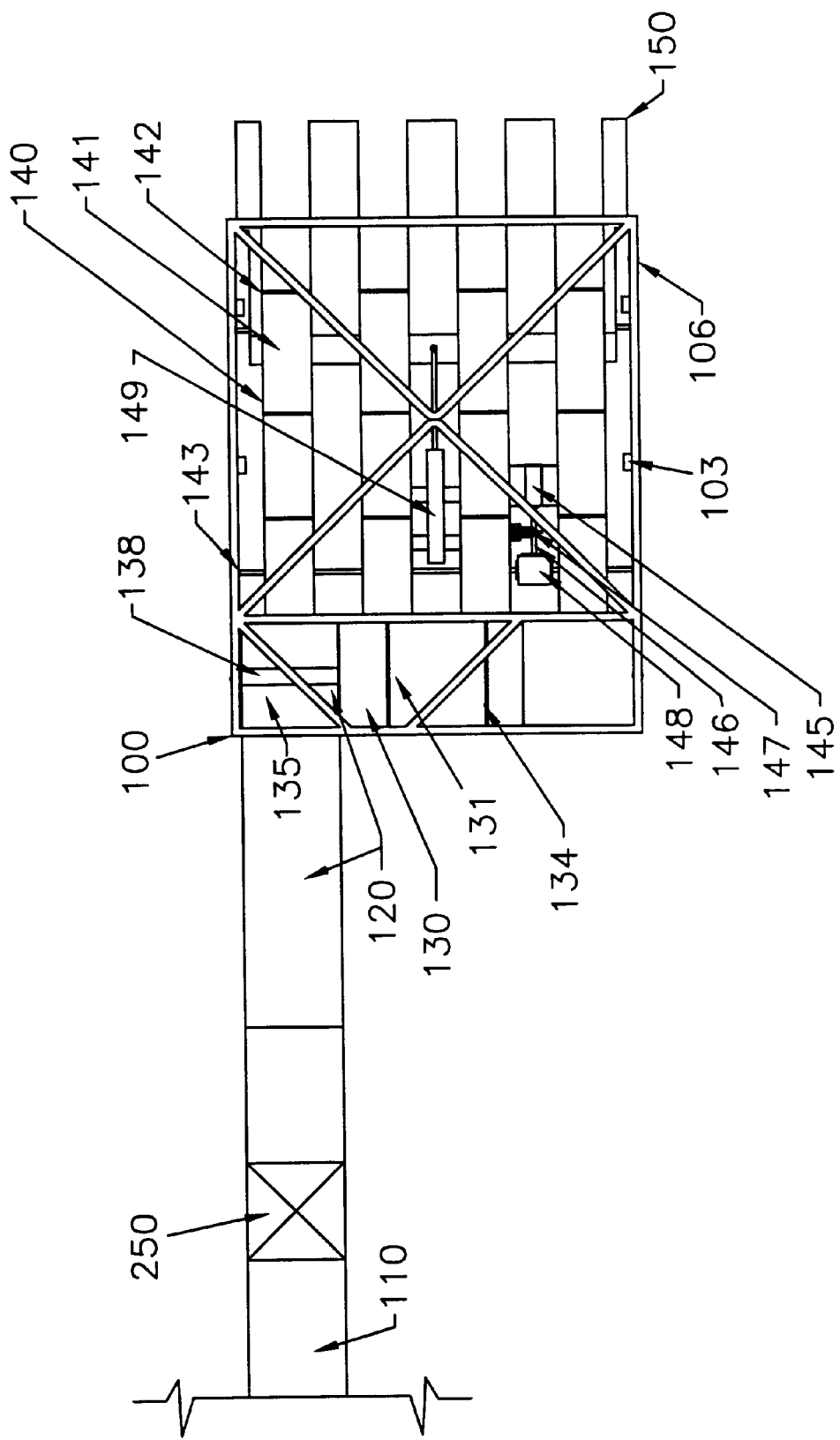
FIG. 5 is an overhead view of the device for automatically loading a container.

Referring now to FIG. 1 through FIG. 5 in which like reference numerals indicate like or corresponding features, FIG. 1 shows the preferred embodiment of the device 100 for automatically loading a container 200. Preferably, the loader 100 consists of a plurality of major components, including a loader deck 130, a delivery platform 140, a retractable delivery guide 150 and a controller 160.

In the preferred embodiment, the loader 100 includes a supporting steel channel frame 101 which is mounted on wheels 102 and 103 to allow its movement into the container 200. The frame 101 is sized to be several inches smaller than the inner dimensions of the container 200 and has guide rollers 106 to allow its easy insertion and centering in the container 200.

Movement of the loader 100 into and out of the container 200 is accomplished using a pneumatic motor 107 attached under the frame 101 to turn a set of drive wheels 102. Guide rollers 106 are included to guide the loader carefully into the container. Pneumatic leveling cylinders 104 are provided to maintain the loader 100 at a constant elevation by decreasing the elevation of the drive wheels 102 as the height of the container 100 changes relative to the loading dock in response to loading. Two additional sets of stabilizing wheels 103 are included near the front of the frame 101 to support the weight of the loader 100 and to facilitate movement of the loader 100. The height of the stabilizing wheels 103 is not adjustable as the stabilizing wheels 103 are maintained inside the loader 100 during all phases of the loading operation.

An accordion feed conveyor belt 110 is positioned such that it may extend to reach the loader 100 when the loader 100 is fully within the container. Furthermore, the accordion feed conveyor belt 110 is capable of being retracted during loading to maintain delivery of the packages 250 to an appropriate location with respect to the loader 100. In the preferred embodiment, the accordion feed conveyor belt 110 will deliver the packages 250 to a second loader conveyor belt 120 which in turn will deliver the packages to one side of the loader deck 130.

The loader deck 130 is a fixed height platform which receives packages 250 directly from the accordion feed conveyor 110 onto from the loader conveyor belt 120. The loader deck includes slide plate 131, providing a smooth surface along which the packages 250 may be moved.

A row forming means is included to move the packages into a lateral row on the loader deck. In the preferred embodiment, this former consists of an overhead pusher 135 which is located directly above the side of the loader deck 130 which receives the packages 250. This pusher includes a 12"×12" pusher plate 136 which is moved by a pneumatic cylinder 138. As each package 250 is deposited upon the loader deck 130, the pusher 135 moves the package 250 laterally one package width toward the other side of the loader deck 130. Any previously deposited packages 250 are also moved over one package width. This process continues until the last package 250 needed to form a complete row of packages 250 is delivered to the loader deck 130. Since a complete row of packages 250 is present at this point, the last package 250 of a row is not subjected to lateral movement by the pusher 135.

Alternately, the rows of packages may be formed by any of a variety of row forming means other than a pusher. These means my include, but not limited to: transverse conveyor belts to move the packages along the deck, pullers to grab the packages and pull them along the deck, or parallel conveyors to simultaneously deliver multiple packages side by side to the loader deck to form a row.

In the preferred embodiment, small pushers 132 are located at intervals consistent with the package width across the slide plate 131. These small pushers 132 can be used to move an assembled row of packages 250 forward from the loader deck 130 to the delivery platform 140. Each pusher includes a small 3"×5" pusher plate 132 which may be driven to move along slot 134 by the action of a pneumatic cylinder.

In an alternate embodiment, the loader deck may include a roller assembly in place of the slide plate to allow the packages 250 to move laterally in the horizontal plane. In this alternate embodiment, frictional motivators may be positioned in the gaps between rollers to move an assembled row of packages 250 forward from the loader deck 130 to the delivery platform 140. These motivators may include a belt of material with a high coefficient of friction, which is looped around two pulleys. This belt is brought into contact with the packages by lifting one of the pulleys. To move the packages 250, the frictional motivator belt can be turned one or more cycles by application of force to one of the pulleys by a pneumatic motor.

The delivery platform 140 includes a plurality of conveyors 141 which are used to incrementally move the packages 250 along the delivery platform 140 and onto the delivery guides 150 during package delivery. The delivery platform conveyor belts 141 each have 1" high ridges 142 projecting from the belt surface at intervals equivalent to one package length which serve to maintain the package spacing and increase the force provided from the belt to the packages 250. In the preferred embodiment, the delivery platform 140 is sized to hold four (4) rows of packages 250.

The delivery platform 140 is moved vertically by a rack gear and sprocket system driven by a pneumatic motor 148 located in the delivery platform 140. The pneumatic motor 148 drives shaft 146 which also passes through pneumatic brake 147. Rotation of shaft 146 is coupled to rotation of the pneumatic motor 148 by worm gears included within the gear housing 145. Rotation of the rear sprocket drive shaft 151 may be coupled to rotation of the front sprocket drive shaft 152 by use of a chain and sprocket or alternatively a second pneumatic motor similar to motor 148 may be attached to the front sprocket drive shaft 152. Sprockets 143 attached to the delivery platform 140 are coupled to the sprocket drive shafts and thereby also subject to rotation by pneumatic motor 148. The sprockets 143 interact with toothed rack gears 144 attached to the loader frame 101 serving to raise or lower the delivery platform 140, similar to the manner in which an elevator moves.

A retractable delivery guide 150 can be extended from within the delivery platform 140, such that the delivery guide is flush with the top of the delivery platform 140, to aid in the placement of the packages 250 onto the growing stack of packages 250. This delivery guide 150 consists of a single plate the width of the loader which is notched, forming a series of comb like teeth extending from the front of the loader 100. The retractable delivery guide 150 the packages 250 from dropping significantly when they are moved from the delivery platform 140 to the growing stack of packages 250. The retractable delivery guide is driven to extend or retract by a pneumatic cylinder 153.

Use of the delivery guide 150 greatly enhances the care and gentleness with which the packages 250 are stacked in the container by the loader 100. It is important to note, that in the preferred embodiment the delivery deck 140 and delivery guides 150 are both horizontal at all times during package delivery, also aiding the careful and gentle manner in which the packages 250 are stacked.

A controller 160 is provided to coordinate the movement of conveyors, pushers, wheels, sprockets and motors involved in operation of the loader. In the preferred embodiment this controller 160 consists of a programmable logic controller 160 which is programmed to load the container 200 in a manner based on the package 250 size and shape. The controller 160 may be located above the loader deck 130 or may be located in a variety of other positions within the loader 100. In the preferred embodiment, all moving parts of the loader 100, including sprockets, pushers, wheels, conveyors, and motors are pneumatically driven and controlled.

The controller 160 may receive information on the location of the loader 100 within the container 200 and the location of packages 250 within the loader and container 200 via a sensory system built into the loader 100. In the preferred embodiment, this sensory system will include a number of optical sensors, 165 although it is also possible that ultrasonic sensors or other sensor types could be used.

Figure 6B:
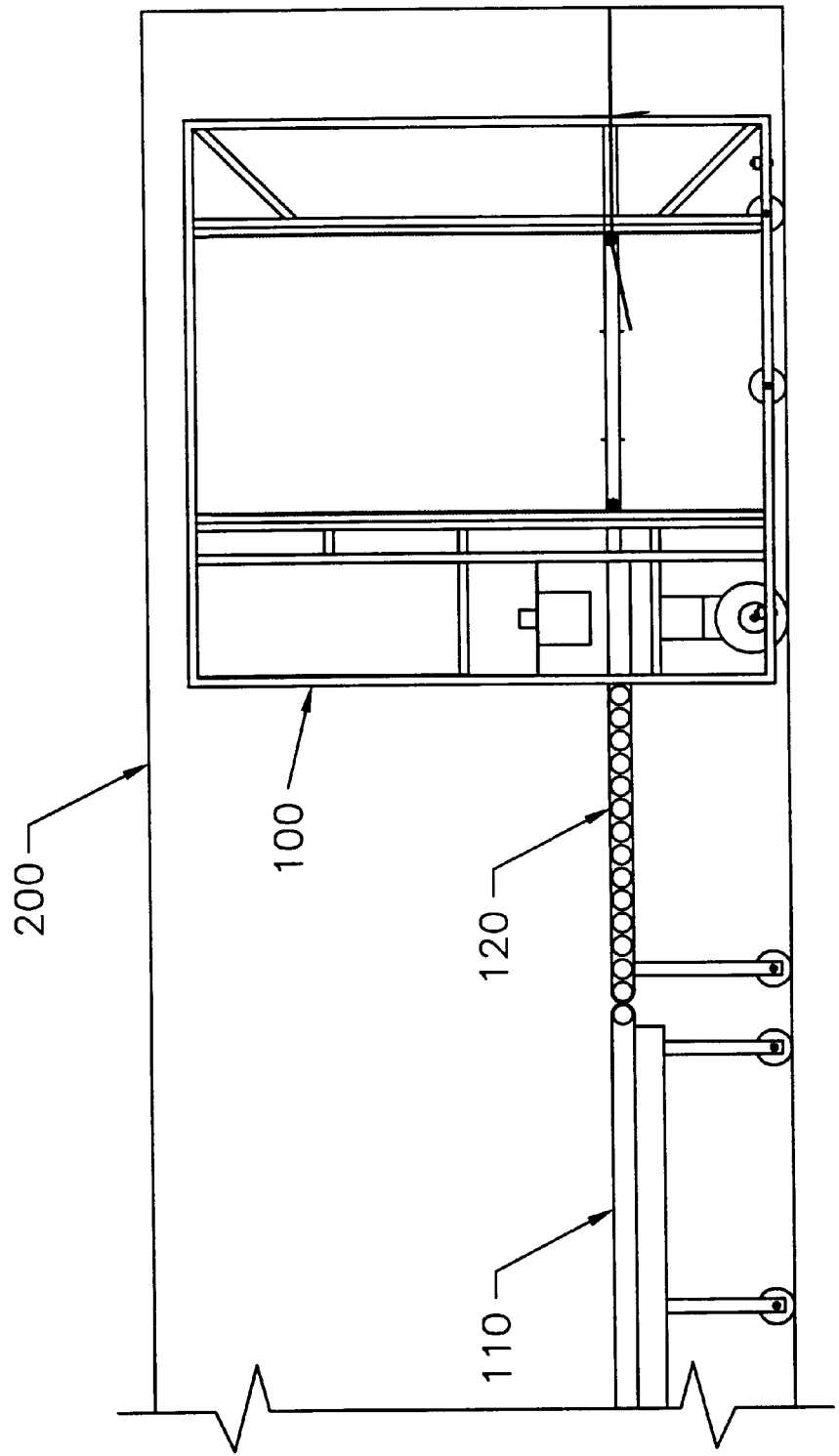
FIGS. 6A–6Q are a series of figures illustrating use of the device for automatically loading a container to load packages into a shipping container.
Figure 6C:
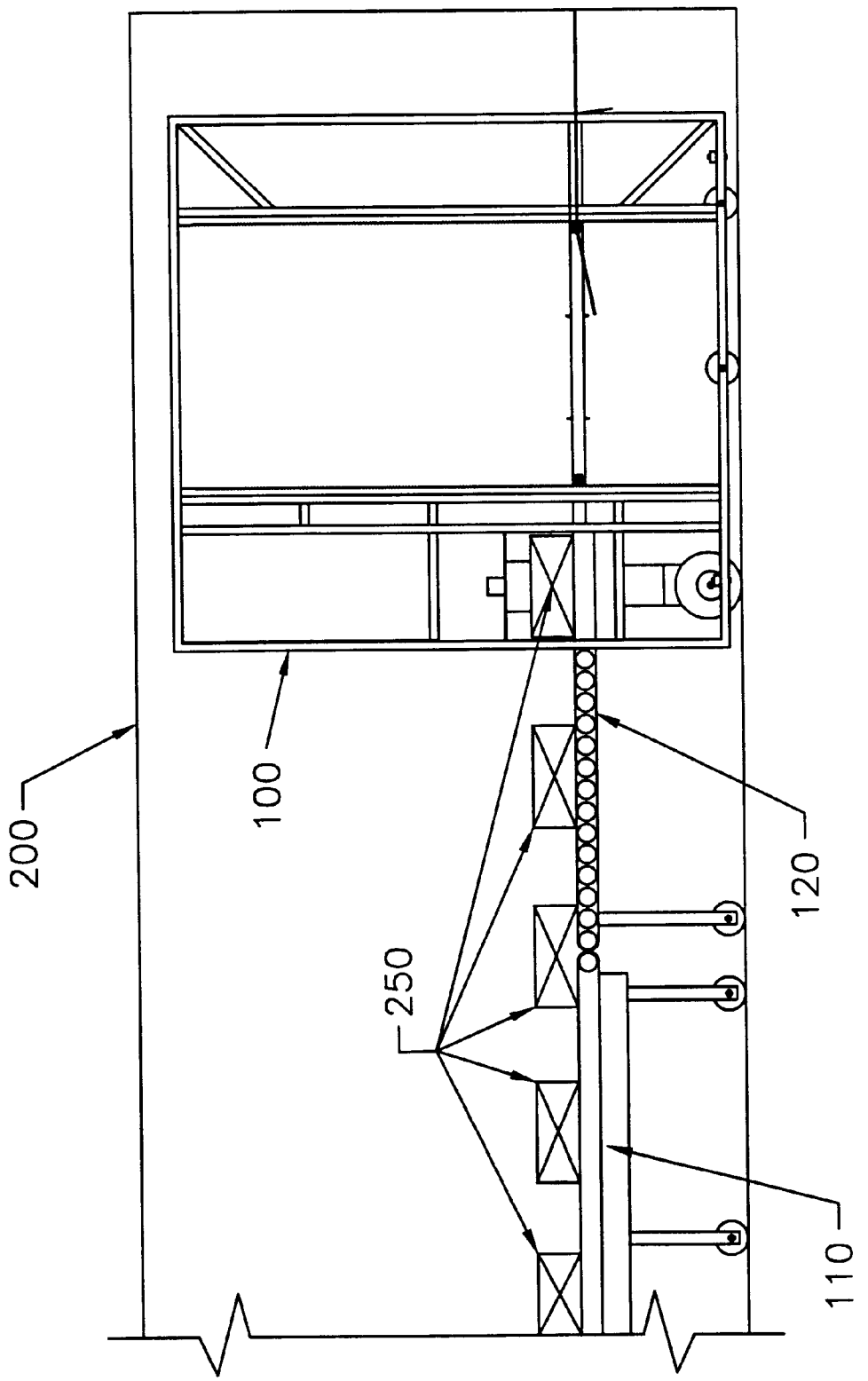

Referring now to FIGS. 6A–6Q, the device for automatically loading a container 100 loads a container 200 according to the following series of steps. Initially, the loader 100 is inserted into a container 200 (FIG. 6) and rolled to the front wall of the container 200 (FIG. 6A). To set this as the home position the loader 100 then moves out one package length to allow room for the first stack of packages 250 (FIG. 6B). Delivery of packages 250 via the variable length conveyor 110 is initiated. The packages are then transferred by conveyor 120 to the loader deck 130 (FIG. 6C).

Figure 6D:
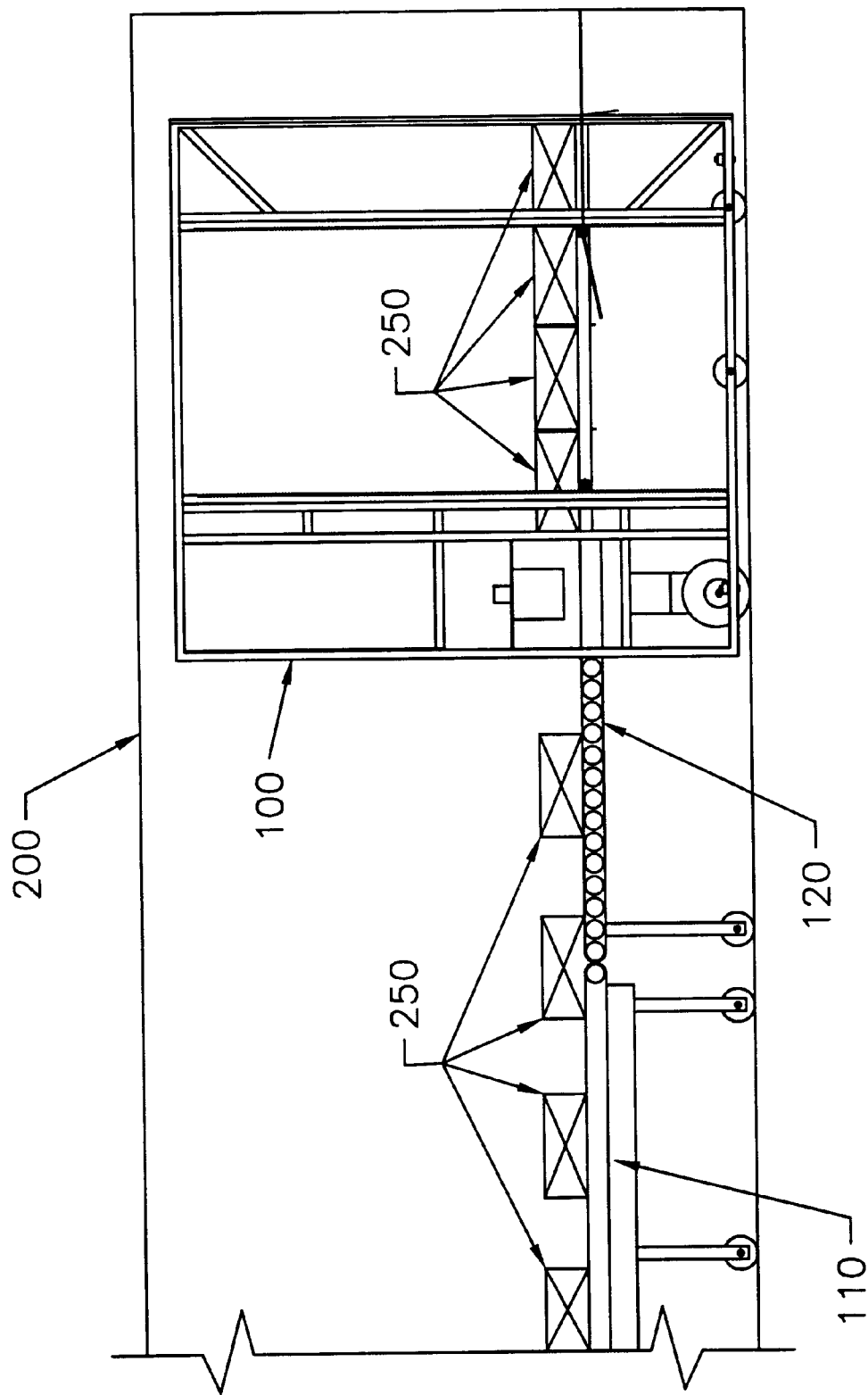
Figure 61:
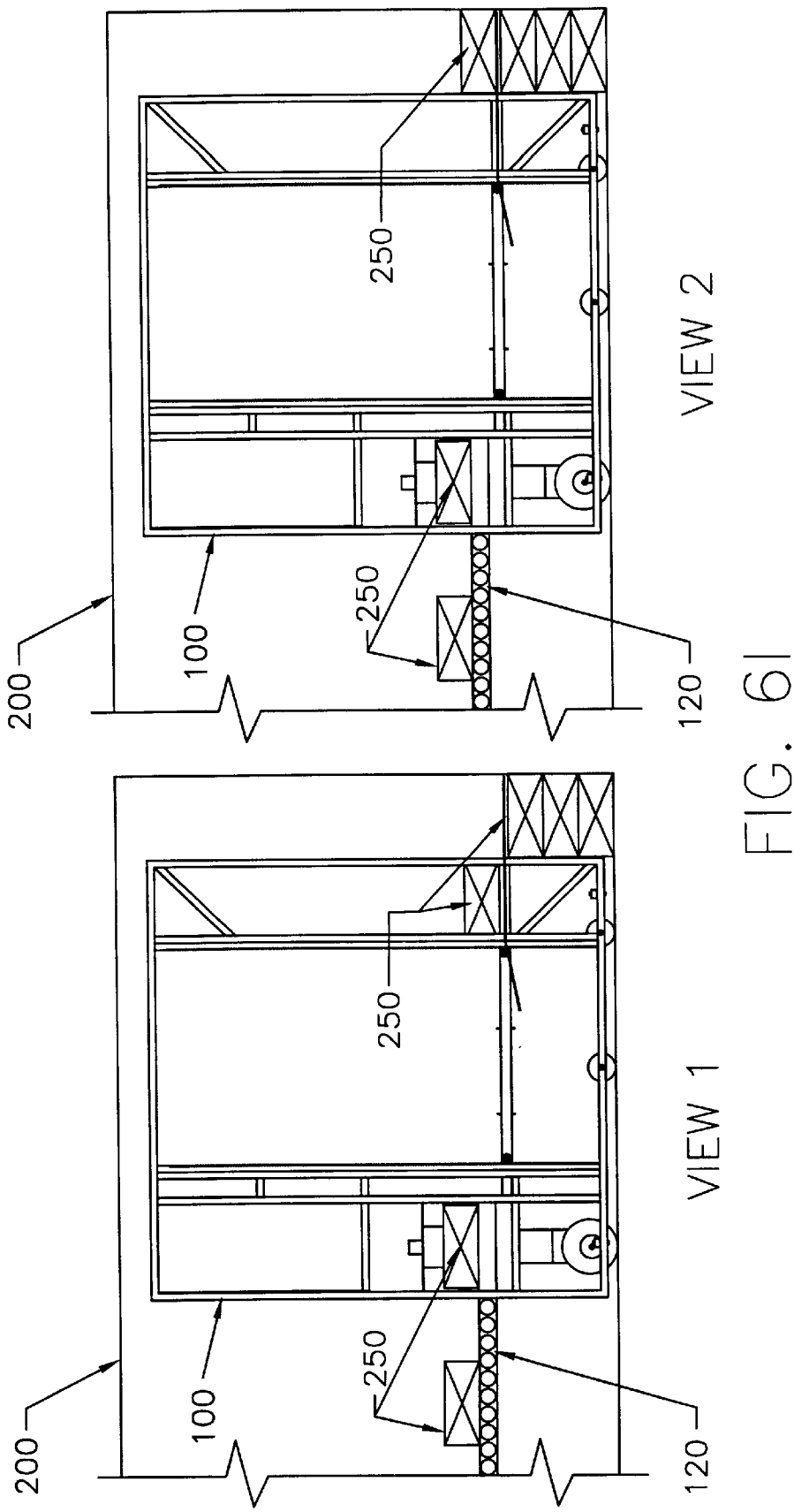

As the packages 250 arrive at the loader deck 130, they are moved laterally along the deck 130 by an overhead pusher 135 to form a complete row of packages 250. As each row of packages 250 is completed, the smaller pushers 132 are activated to index the row 250 one package length onto the delivery platform 140. This process is repeated until the delivery platform 140 is filled completely with rows of packages 250 (FIG. 6D). In the preferred embodiment the delivery platform 140 will hold four (4) rows of packages 250.

Once the delivery platform 140 is filled, delivery of packages 250 to the loader 100 is temporarily halted while the delivery platform 140 moves downward in an elevator-like fashion to deliver the first row of packages 250 to the front floor of the container 200. The delivery platform conveyors 141 are then activated to index the packages 250 forward one package length, with the front row of packages 250 moving forward onto the extended retractable delivery guides 150 (FIG. 6E, view 1). The delivery guides 150 then retract and the row of packages 250 is deposited on the floor of the container 200 (FIG. 6E, view 2). Note that the frame 101 of the loader 100 helps to maintain alignment of the packages 250.

Following delivery of the first row of packages 250, the delivery platform 140 indexes up one level for delivery of the next row of packages 250 onto the previously deposited row (FIG. 6f, view 1). The packages 250 are then, again, indexed forward one package length, with the front row of packages 250 moving onto the retractable delivery guides 150 (FIG. 6F, view 2). The retractable delivery guide serves to gently and precisely stabilize the placement of the row of packages 250 on the lower row and then retracts, leaving the stack of packages 250 one row higher than before (FIG. 6G). This process is repeated (FIGS. 6H–6J, view 1) until all of the rows or packages 250 on the delivery platform 140 have been dispensed.

Figure 6L:
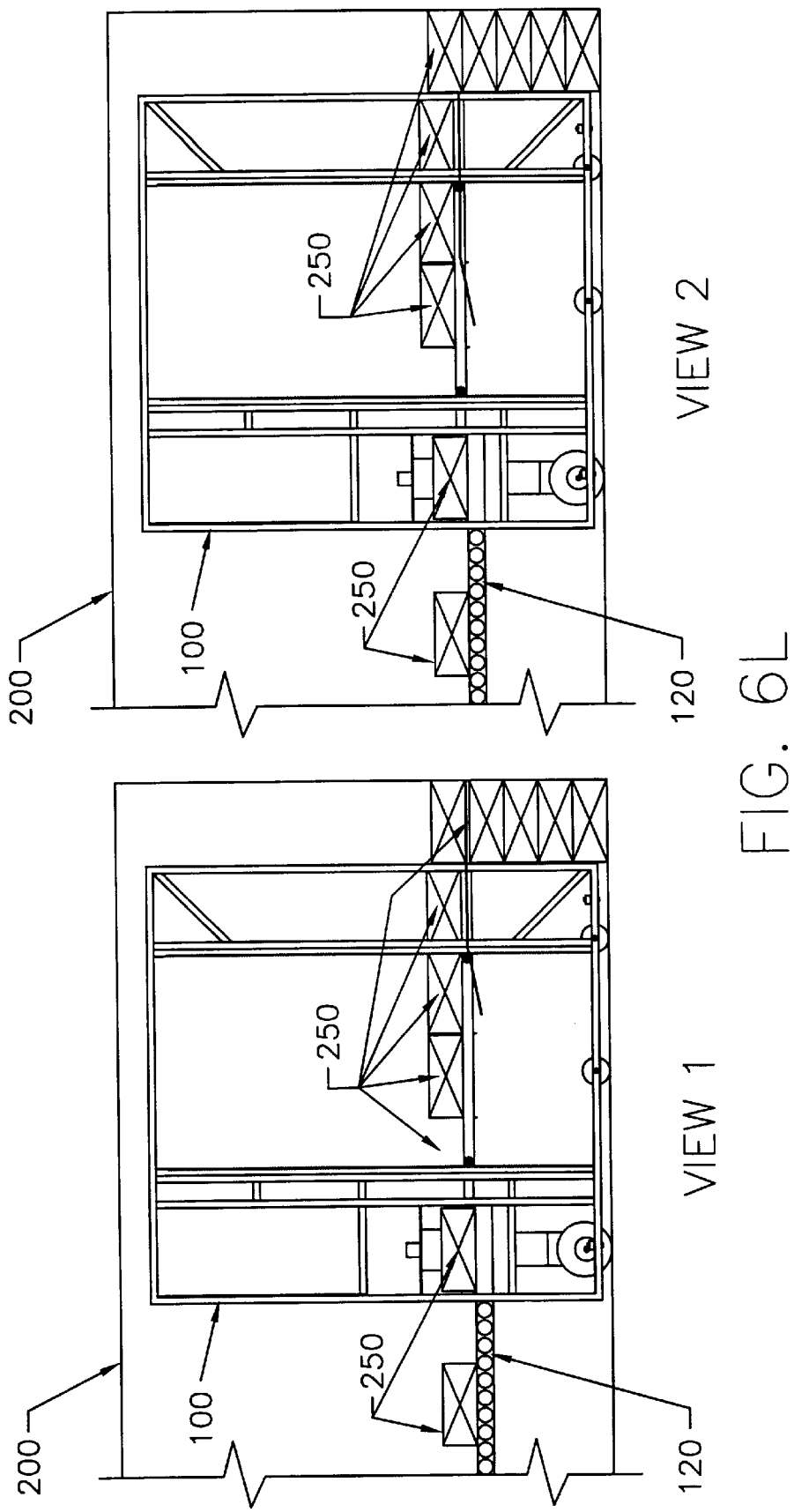
Figure 6M:
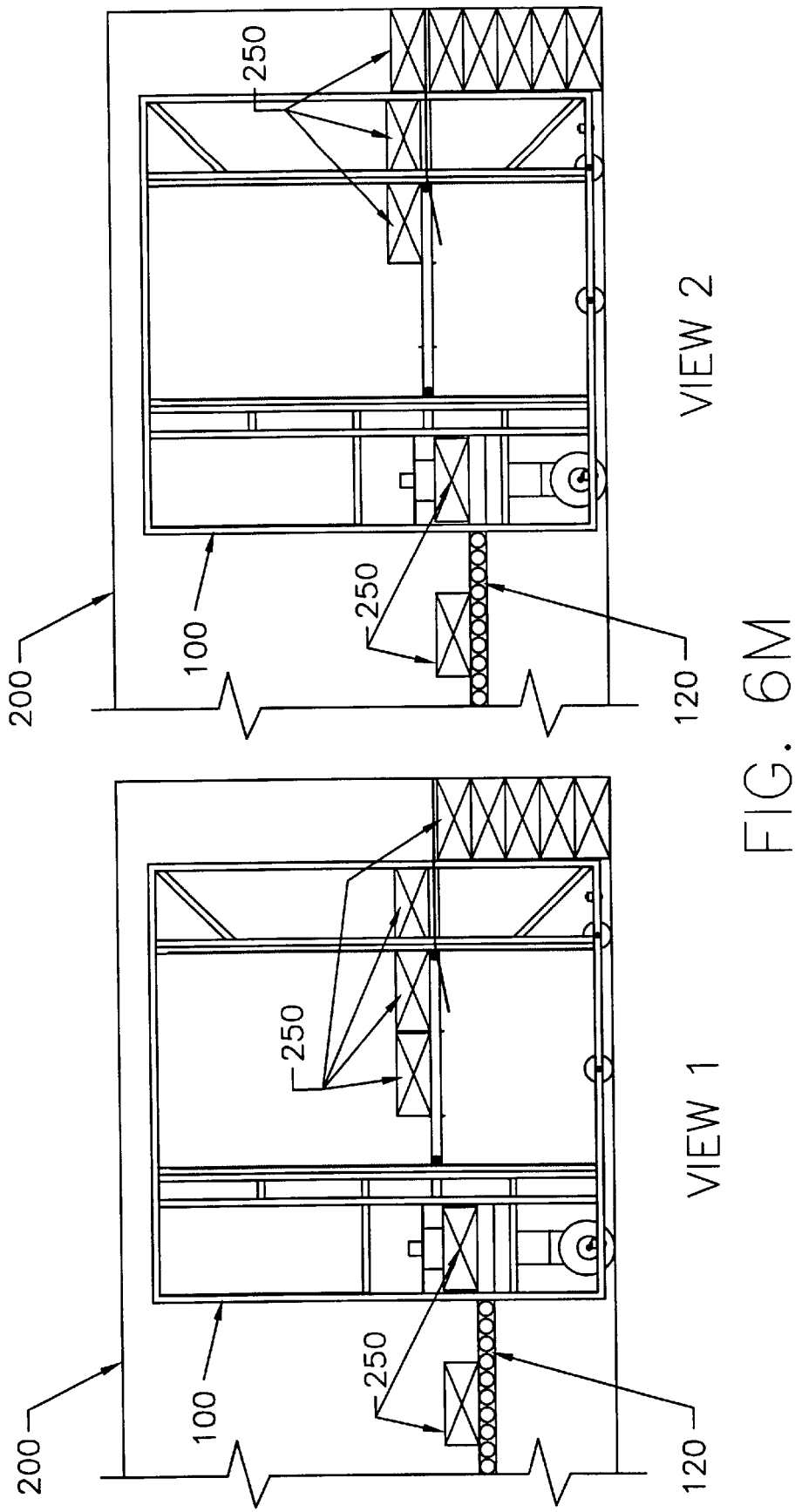
Figure 6N:
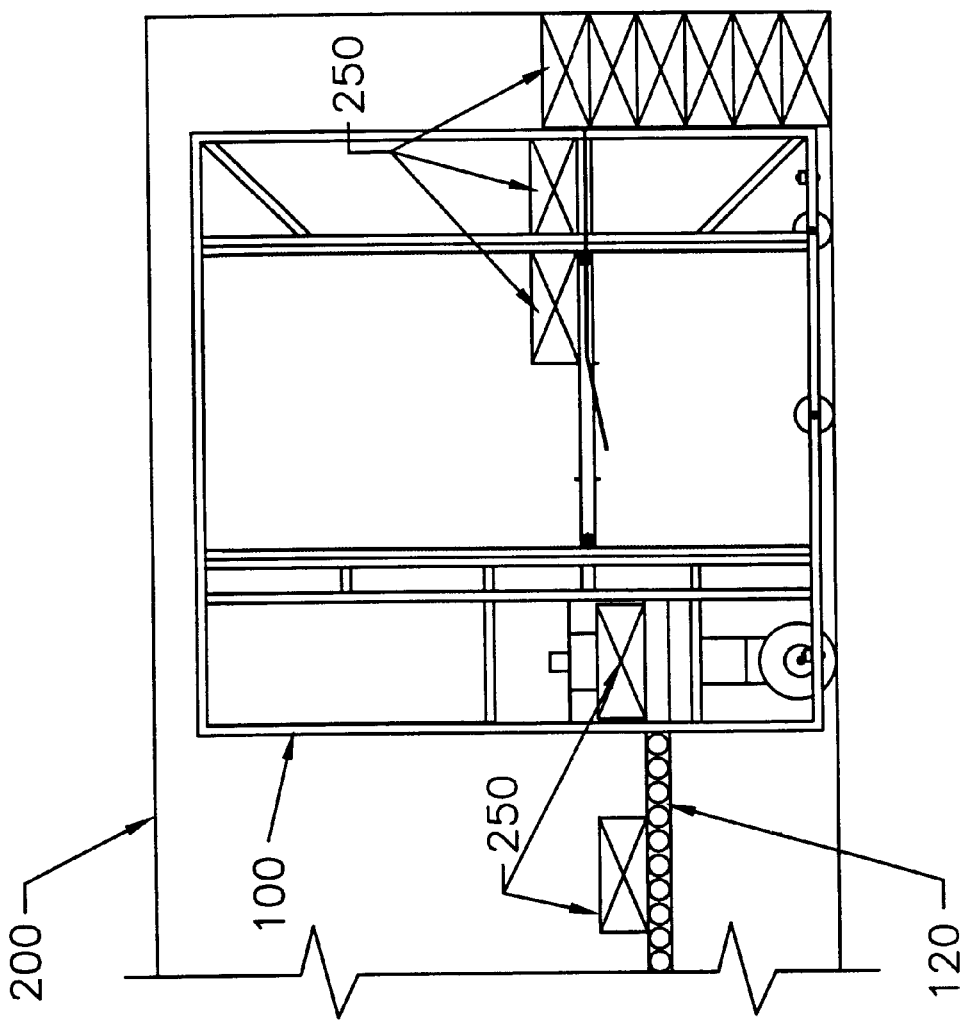
Figure 60:
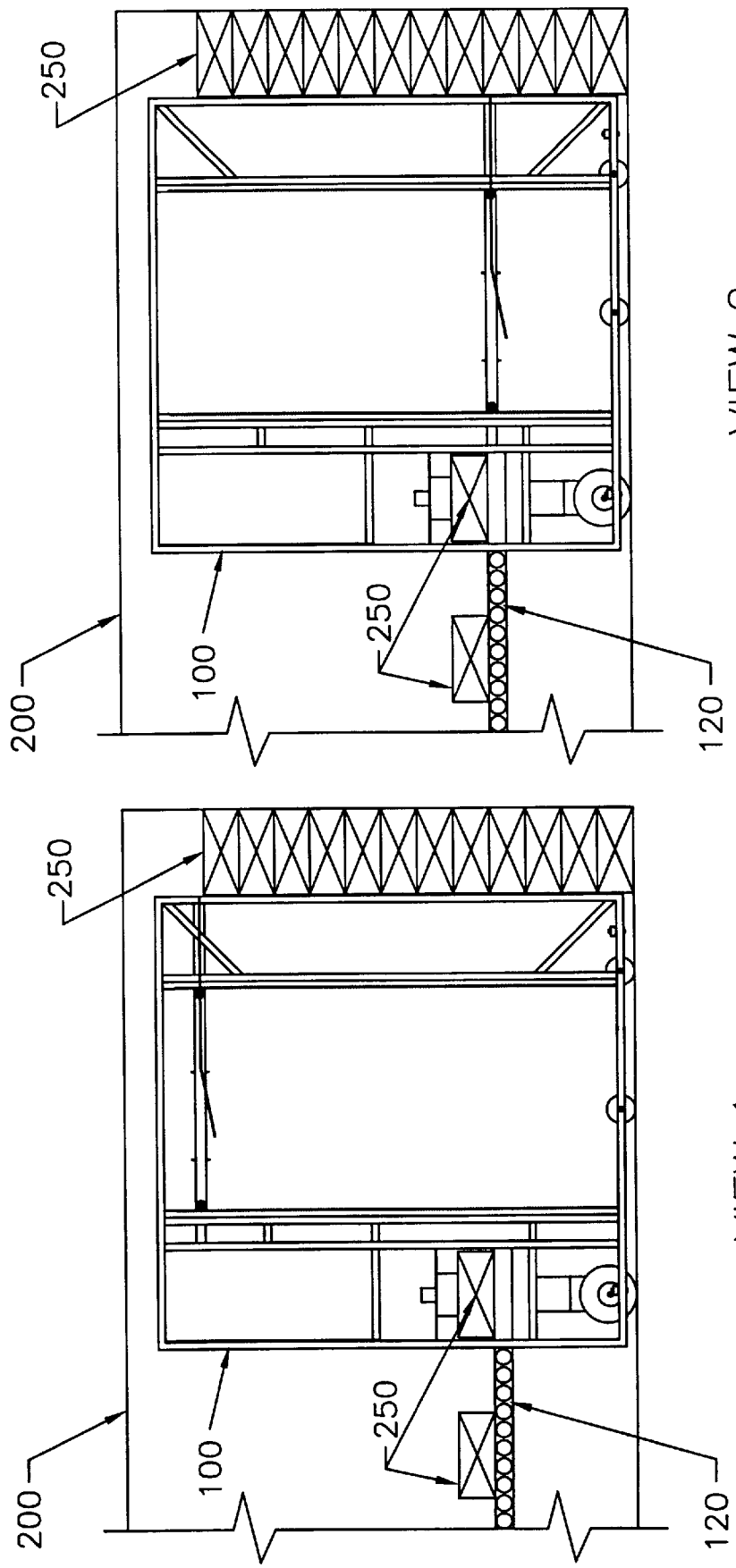

Next, the delivery platform 140 moves back into alignment with the loader deck 130 (FIG. 6J, view 2) and delivery of packages 250 to the loader deck 130 is resumed, beginning the loading cycle anew (FIG. 6L, view 1). This cycle continues (FIG. 6L, view 2–60, view 1) until the desired height or ceiling of the container is reached, forming one complete stack of rows of packages 250. Delivery Platform 140 then moves back to the home position for reloading (FIG. 6O, view 2). At this point the loader 100 backs one package length out of the container 200 (FIG. 6P, view 1) and the stack loading process begins anew (FIG. 6P, view 2). This process is repeated, with the loader 100 backing out one package length as each stack of packages 250 is completed, until the container 200 is filled (FIG. 6P, view 2).

In an alternate embodiment, the loading process described above may also be reversed and adapted to unload a trailer or shipping container. For unloading, it is necessary to modify the device to include a suction cup or other means for grabbing to retract the packages onto the delivery platform. The delivery platform itself is be positioned approximately 1" below the bottom of the row of boxes to be collected, holding the supporting lower row in place. After collecting four rows of packages, the delivery platform then travels back into alignment with the loader deck and the packages are transferred to the loader deck by the delivery platform conveyors. The packages are then be subjected to the action of a small pusher operating in the transverse direction and moved to one end of the loader deck and onto the short conveyor. The short conveyor then delivers the packages to the accordion conveyor for removal from the container. This process then is repeated in a reversed pattern from that used in the loading embodiment.

What has been described above are preferred embodiments of the present invention. It is, of course, not possible to describe every conceivable combination of methodologies for purposes of describing the present invention. However, one of ordinary skill in the art will recognize that any further combinations, permutations and modifications of the present invention are possible. Therefore, all such possible combinations, permutations and modifications are to be included within the scope of the claimed invention, as defined by the claims below.

What is claimed is:

1. An apparatus for automatically loading packages into a container having a floor, opposing ends which define a longitudinal direction therebetween, and opposing sides which define a lateral direction therebetween, said apparatus comprising:

a frame positionable entirely within the container, said frame residing in contact with the floor of the container when said frame is within the container;

a loader deck connectable to a source of packages, said loader deck extending sufficiently in a lateral direction so as to enable the formation thereon of a lateral row of packages received from said source of packages, wherein a lateral row of packages extends in the lateral direction and includes a plurality of adjacent packages;

a delivery platform cooperative with said loader deck and movable between a first platform position at a first elevation and a second platform position at a second elevation, said delivery platform remaining at least substantially horizontal relative to the floor of the container during any movement of said delivery platform between said first and second platform positions, said delivery platform extending sufficiently in the longitudinal direction of the container to simultaneously support a first lateral row of packages and a second lateral row of packages adjacent in the longitudinal direction to said first lateral row of packages, said first lateral row of packages being deliverable at said first elevation and said second lateral row of packages being deliverable at said second elevation;

a first device movable between a first loader deck position and a second loader deck position, wherein movement of said first device from said first loader deck position to said second loader deck position directs said lateral row of packages from said loader deck to said delivery platform; and a second device movable between a first delivery position, a second delivery position, and a third delivery position, wherein movement of said second device from said first delivery position to said second delivery position when said delivery platform is in said first platform position directs said first lateral row of packages off of said delivery platform, wherein movement of said second device from said second delivery position to said third delivery position when said delivery platform is in said second platform position directs said second lateral row of packages off of said delivery platform and atop said first lateral row of packages;

wherein said frame supports said loader deck and said delivery platform.

2. The apparatus of claim 1, further comprising a variable length conveyor belt disposed to enable the transfer of packages from said source of packages to said loader deck.

3. The apparatus of claim 1, wherein said apparatus further includes a retractable delivery guide extendable from said delivery platform into a position which stabilizes a lateral row of packages during delivery of the lateral row of packages off of said delivery platform.

4. The apparatus of claim 3 wherein said retractable delivery guide includes a thin plate extendable from said delivery platform.

5. The apparatus of claim 3 wherein said retractable delivery guide includes a plurality of separated plates extendable from said delivery platform.

6. The apparatus of claim 1, wherein said apparatus further comprises a controller, wherein movements of said frame, said delivery platform, said first device, and said second device are controllable by said controller.

7. The apparatus of claim 6, wherein said apparatus further comprises a plurality of sensors, said plurality of sensors being cooperative with said controller to coordinate movement of said frame, said delivery platform, said first device, and said second device.

8. The apparatus of claim 7, wherein said plurality of sensors includes an optical sensor.

9. The apparatus of claim 7, wherein said plurality of sensors includes an ultrasonic sensor.

10. The apparatus of claim 1, wherein said frame is positionable at a first frame position associated with the location of a first stack of lateral rows of packages and at a second frame position associated with the location of a second stack of lateral rows of packages, wherein said first frame position and said second frame position are longitudinally offset at different distances relative to an end of the container.

11. The apparatus of claim 10, wherein said apparatus further comprises a controller, said frame being automatically movable from said first frame position to said second frame position in response to signals from said controller upon delivery of a stack of lateral rows of packages.

12. A process for automatically loading packages into a container having ends which define a longitudinal direction therebetween and sides which define a lateral direction therebetween, the process comprising the steps of:

receiving a plurality of packages from a source of packages;

forming from said plurality of packages first and second rows of adjacent packages on a delivery platform, wherein each row of adjacent packages extends in the lateral direction of the container and includes at least two packages, and wherein the first and second rows of adjacent packages reside on the delivery platform at the same time;

positioning the delivery platform on which the first and second rows of adjacent packages reside in a first delivery position for delivery of the first row of adjacent packages into the container;

delivering the first row of adjacent packages into the container;

positioning the delivery platform in a second deliver position for delivery of the second row of adjacent packages into the container; and delivering the second row of adjacent packages into the container.

13. The process of claim 12, wherein the step of delivering includes a step of delivering the second row of adjacent packages atop the first row of adjacent packages.

14. The process of claim 12, wherein the first and second delivery positions are at different elevations.

15. The process of claim 12, wherein the step of receiving includes receiving packages of the plurality of packages as the packages travel along a path substantially in the longitudinal direction of the container, and wherein the step of forming includes a step of changing the direction of travel of the packages of the plurality of packages from the longitudinal direction of the container to the lateral direction of the container.

16. The process of claim 15, wherein the step of forming further includes a step of moving a package of the plurality of packages in the lateral direction of the container until the package abuts and is adjacent to a previously received package of the plurality of packages.

17. The process of claim 12, wherein the step of forming and all of the steps of positioning and delivering are performed automatically.

18. The process of claim 12, wherein the step of forming includes a step of assembling the rows of adjacent packages on a loading deck and a step of moving the rows of adjacent packages onto the delivery platform.

19. The process of claim 12, wherein the process further includes a step of automatically moving the delivery platform in the longitudinal direction of the container after the completed delivery into the container of a vertical stack of rows of adjacent packages.

20. The process of claim 19, wherein the process further includes a step of causing retraction of at least a portion of a retractable conveyor in response to movement of the delivery platform in the longitudinal direction of the container.

21. The process of claim 13, wherein the step of delivering the first row of adjacent packages includes a step of moving the first row of adjacent packages in the longitudinal direction of the container.

22. The process of claim 13, wherein the step of forming includes a step of orienting the first and second rows of adjacent packages on the delivery platform while the delivery platform is in a loading position, and wherein the steps of positioning the delivery platform in a first delivery position and positioning the delivery platform in a second delivery position occur absent a return of the delivery platform to the loading position during the time between the steps of positioning.

23. An apparatus for automatically loading packages into a container having a floor, opposing ends which define a longitudinal direction therebetween, and opposing sides which define a lateral direction therebetween, said apparatus comprising:

a frame rollable into and within the container in the longitudinal direction of the container;

a delivery platform connected to said frame and movable in a vertical direction relative to the floor of the container between a loading position, a first platform position at a first elevation, and a second platform position at a second elevation, said delivery platform extending sufficiently in the longitudinal direction of the container so as to be loadable from a package source with at least two lateral rows of packages present on said delivery platform at the same time; and, a device connected to said frame and movable between a first device position, a second device position, and a third device position, wherein movement of said device between said first and second device positions directs a first lateral row of packages off of the delivery platform when the delivery platform is in said first platform position, wherein movement of said device between said second and third device positions directs a second lateral row of packages off of the delivery platform when the delivery platform is in said second platform position and absent return of said delivery platform to said loading position.

24. The apparatus of claim 23, wherein said delivery platform is movable only in a manner which maintains at all times said delivery platform in a substantially horizontal attitude relative to the floor of the container.

* * * * *